US008397250B2

(12) United States Patent  
Ogawa

(10) Patent No.: US 8,397,250 B2
(45) Date of Patent: Mar. 12, 2013

(54) DISC TRANSFER MECHANISM AND DISC DRIVE APPARATUS

(75) Inventor: Motoharu Ogawa, Maebashi (JP)

(73) Assignee: JVC Kenwood Corporation, Yokohama-Shi (JP)

( * ) Notice: Subject to any disclaimer, the term of this patent is extended or adjusted under 35 U.S.C. 154(b) by 62 days.

(21) Appl. No.: 13/186,550

(22) Filed: Jul. 20, 2011

(65) Prior Publication Data

US 2012/0023510 A1 Jan. 26, 2012

(30) Foreign Application Priority Data

Jul. 21, 2010 (JP) .................................. 2010-163468

(51) Int. Cl.
*G11B 17/04* (2006.01)
(52) U.S. Cl. ........................................................ 720/624
(58) Field of Classification Search .................... 720/624
See application file for complete search history.

(56) References Cited

U.S. PATENT DOCUMENTS

| 6,646,973 | B2 * | 11/2003 | Kikuchi et al. ............... 720/624 |
| 7,107,603 | B2 * | 9/2006 | Tuchiya ........................ 720/713 |
| 7,308,692 | B2 * | 12/2007 | Kasama et al. ............... 720/625 |
| 7,472,403 | B2 * | 12/2008 | Tatekawa et al. ............. 720/624 |
| 7,814,504 | B2 * | 10/2010 | Aoki et al. ..................... 720/624 |
| 7,958,522 | B2 * | 6/2011 | Miyata .......................... 720/673 |
| 2005/0050565 | A1 * | 3/2005 | Yoshimura ..................... 720/624 |
| 2005/0289570 | A1 * | 12/2005 | Jernstrom et al. ............. 720/624 |
| 2007/0174857 | A1 * | 7/2007 | Lee ................................ 720/624 |

FOREIGN PATENT DOCUMENTS

JP 08-138298 5/1996

* cited by examiner

*Primary Examiner* — Mark Blouin
(74) *Attorney, Agent, or Firm* — Marvin A. Motsenbocker; Mots Law, PLLC

(57) ABSTRACT

A disc transfer mechanism includes a feed roller provided between a drive unit incorporated in a drive apparatus main body and an insert slot formed in the apparatus main body; a roller supporting member pivotably supporting the feed roller between a disc transfer position and an evacuated position; a drive cam for pivoting the feed roller between the disc transfer position and the evacuated position; and a driven cam moving in cooperation with pivoting of the feed roller. The drive cam engages with a rotation shaft of the feed roller and moves rectilinearly along one peripheral end of the drive unit, and the driven cam moves rectilinearly along the other peripheral end of the drive unit.

7 Claims, 20 Drawing Sheets

DISC TRANSFER MECHANISM AND DISC DRIVE APPARATUS

CROSS REFERENCE TO RELATED APPLICATIONS

This application claims priority based on 35 USC 119 from prior Japanese Patent Application No. P2010-163468 filed on Jul. 21, 2010, entitled "DISC TRANSFER MECHANISM AND DISC DRIVE APPARATUS", the entire contents of which are incorporated herein by reference.

BACKGROUND OF THE INVENTION

1. Field of the Invention

The present invention relates to a disc drive apparatus used for reproducing music information, for example, recorded in a disc (disc-shaped information recording medium) and recording desired information in a disc. More particularly, the invention relates to a disc transfer mechanism incorporated in an apparatus for transferring the disc, and a disc drive apparatus including the mechanism.

2. Description of Related Art

A conventionally known disc drive apparatus for recording desired information in a disc and reproducing the recorded information is one in which a disc inserted into an insert slot is transferred directly, without using a tray for loading the disc, to a predetermined position by a transfer mechanism. A well-known disc transfer mechanism used for the slot-in type disc drive apparatus is a type in which a disc is transferred by sandwiching the disc between a roller (feed roller) that rotates in obverse and reverse directions and a plate-shaped member. For example, Japanese Patent No. 3402408 hereinafter described as Patent Document 1 discloses the disc transfer mechanism.

It should be noted that in the present specification, the part corresponding to the "disc drive apparatus" described in Patent Document 1 is referred to as a "drive unit", and the entire apparatus including the "drive unit" and a "disc transfer mechanism" is referred to as a "disc drive apparatus."

In the disc transfer mechanism using the roller, as described in Patent Document 1, the roller is rotatably supported by a support part and both ends of the support part are pivotably supported on a case so that the roller is spring-urged upward. When, for example, the disc loaded in the apparatus is driven for reproducing, the roller support part is pressed downward against the spring force so that the roller can be evacuated to a position moved away from the disc.

However, in the case that the roller and the support part are pressed downward against the spring force when, for example, driving a disc for reproducing as in Patent Document 1. The drive source for the member that serves to press the roller and the support part downward (a drive cam in the invention) is placed under a heavy load. If the spring force is weakened to reduce the load, the transfer force from the feed roller that acts on the disc is reduced. Consequently, a problem arises that the disc cannot be transferred appropriately.

In the case of a disc drive apparatus used under a vibration environment, such as in an automobile, it is a common practice to elastically support the drive unit in order to prevent dropouts in music reproduction, for example. However, when the disc is transferred and the drive unit is kept in an elastically supported condition, the relative position between the drive unit and the disc transfer mechanism is not fixed so it is possible that the disc may not be guided onto the turntable of the drive unit. For this reason, that kind of disc drive apparatus commonly has a lock mechanism for restraining the drive unit so as to restrict the vibration of the drive unit, except when the disc is on the turntable.

In some cases, the above-mentioned member for pressing the feed roller downward may be utilized for such a lock mechanism. However, since the member is provided only on one side of the drive unit, it is impossible to secure and support the drive unit appropriately only by the member. Moreover, even if such members for the lock mechanism are provided on both sides of the drive unit, it is necessary to, for example, connect the two members with each other by a link member so as to interlock the two members. Consequently, parts count and the assembling man-hour for the apparatus as a whole increase, resulting in a cost increase.

SUMMARY OF THE INVENTION

The invention has been accomplished in view of the foregoing circumstances, and it is an object of the invention to provide a disc transfer mechanism with a simple structure and a small parts count so that a disc can be transferred appropriately, and to enable the drive unit to be secured and supported by utilizing the disc transfer mechanism when, for example, transferring a disc.

In order to accomplish the foregoing objects, the present invention provides:

(1) A disc transfer mechanism comprising:

a rotatable feed roller provided between a drive unit having a turntable for rotating a disc and an insert slot through which the disc is inserted and removed;

a roller supporting member pivotably supporting the feed roller and pivoted around a pivot shaft parallel to a rotation shaft of the feed roller between a disc transfer position at which the feed roller is in contact with the disk inserted into the insert slot and an evacuated position at which the feed roller is separated away from the disc supported by the turntable;

a drive cam engaged with the rotation shaft, pivoting the feed roller between the disc transfer position and the evacuated position while moving rectilinearly along one end of the drive unit and restraining the drive unit when the feed roller is at the disc transfer position; and a driven cam engaged with the rotation shaft moving rectilinearly along the other end of the drive unit by the pivoting of the feed roller and restraining the drive unit when the feed roller is at the disc transfer position.

(2) The disc transfer mechanism as in the foregoing (1) may further include: a first elastic member for urging the drive cam toward one end of a moving direction; and a second elastic member for urging the driven cam toward one end of a moving direction, wherein the urging force of the first elastic member and the second elastic member acts in a direction in which the feed roller is directed toward the disc transfer position through the engaged portions of the drive cam and the driven cam with the rotation shaft of the feed roller.

(3) In the disc transfer mechanism as described in the foregoing (1) may further include: a trigger lever provided adjacent to the drive cam, wherein the drive cam comprises a slidable rack member for meshing with a pinion of a gear transmission unit interposed between the drive cam and a drive source, wherein the trigger lever slides the rack member to a position meshing with the pinion while swung and pressed by the disc loaded by the feed roller to a predetermined position in the apparatus main body.

(4) The invention also provides a disc drive apparatus including: an apparatus main body having an insert slot for inserting a disc; a drive unit having a turntable for rotating the disc and incorporated in the apparatus main body; a rotatable feed roller provided between the insert slot and the drive unit; a roller supporting member pivotably supporting the feed roller between a disc transfer position at which the feed roller is in contact with the disk inserted into the insert slot and an evacuated position at which the feed roller is moved away from the disc supported by the turntable so as to pivot the feed roller around a pivot shaft parallel to a rotation shaft of the feed roller; a drive cam engaged with the rotation shaft of the feed roller, pivoting the feed roller between the disc transfer position and the evacuated position while moving rectilinearly along one peripheral end of the drive unit and restraining the drive unit when the feed roller is at the disc transfer position; and a driven cam engaged with the rotation shaft of the feed roller, moving rectilinearly along the other end of the drive unit by the pivoting of the feed roller and restraining the drive unit when the feed roller is at the disc transfer position.

(5) The disc drive apparatus as in the foregoing (4) may further include: a first elastic member for urging the drive cam toward one end of a moving direction thereof; and a second elastic member for urging the driven cam toward one end of a moving direction thereof, wherein the urging force of the first elastic member and the second elastic member acts in a direction in which the feed roller is directed toward the disc transfer position through the engaged portions of the drive cam and the driven cam with the rotation shaft of the feed roller.

(6) In the disc drive apparatus as in the foregoing (4): the drive cam has a slidable rack member; a gear transmission unit having a pinion meshable with the rack member is interposed between the drive cam and a drive source for rotation driving the feed roller; and a trigger lever for sliding the rack member to a position meshing with the pinion while swung and pressed by the disc loaded by the feed roller to a predetermined position in the apparatus main body is provided adjacent to the drive cam.

(7) In addition, the drive unit may be elastically supported by an anti-vibration damper; and each of the drive cam and the driven cam has a unit-securing-and-supporting portion for restraining an edge portion of the drive unit when the feed roller is at the disc transfer position.

According to the invention, the drive cam and the driven cam are engaged with both ends of the feed roller. Therefore, even when the number of the springs for pressing the feed roller against the disc to be transferred is reduced or when the spring force of the springs is weakened, the feed roller can be retained at the position to be pressed against the disc by the drive cam and the driven cam. As a result, the disc can be transferred appropriately while the feed roller is kept pressed against the disc.

In particular, the disc transfer mechanism has a first elastic member for urging the drive cam toward one end of a moving direction thereof and a second elastic member for urging the driven cam toward one end of a moving direction thereof. The urging force of the two elastic members acts in a direction in which the feed roller is directed toward the disc transfer position through the engaged portions of the drive cam and the driven cam with the rotation shaft of the feed roller. Therefore, due to the function of the elastic members, the feed roller can be pressed firmly against the disc, so that the disc can be transferred appropriately.

In addition, according to embodiments, the drive cam and the driven cam are engaged with the respective ends of the feed roller so that the driven cam can move rectilinearly in cooperation with pivoting of the feed roller by the drive cam. As a result, no dedicated part is needed for the linked movement of the drive cam and the driven cam and the manufacturing cost can be suppressed by employing the simple structure.

Moreover, the drive cam has a slidable rack member for meshing with a pinion of a gear transmission unit interposed between the drive cam and a drive source for rotation driving the feed roller, and a trigger lever is provided adjacent to the drive cam and is for sliding the rack member to a position meshing with the pinion while swung and pressed by the disc loaded by the feed roller to a predetermined position in the apparatus main body. Therefore, the rotating and pivoting of the feed roller as well as the rectilinear movement of the drive cam and the driven cam can be performed by a single drive source.

In addition, since the drive unit is elastically supported by an anti-vibration damper, recording and reproducing of information can be performed appropriately even under a vibration environment. Furthermore, each of the drive cam and the driven cam has a unit-securing-and-supporting portion for restraining an edge portion of the drive unit when the feed roller is at the disc transfer position. Therefore, the disc loaded by the feed roller in the apparatus main body can be arranged appropriately for the drive unit in a restrained state.

DETAILED DESCRIPTION OF EMBODIMENTS

Figure 1:
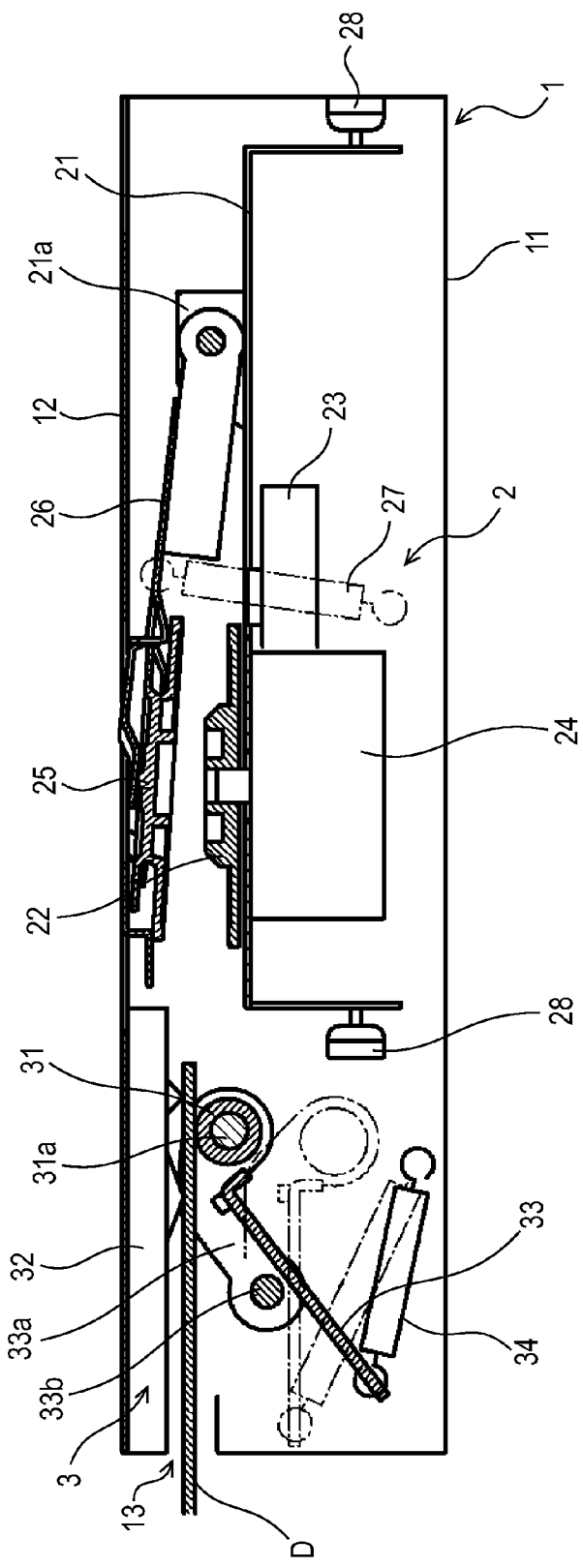
FIG. 1 shows a side view illustrating the internal structure of a drive apparatus having a disc transfer mechanism according to the embodiment.

Hereinbelow, embodiments will be described in detail with drawings. First, in FIG. 1, reference numeral 1 denotes a case (apparatus main body) that forms the exterior of the apparatus. The case 1 has a base chassis 11 formed by press-molding a metal plate and a top plate 12 for covering the upper portion of the base chassis 11. A horizontal insert slot 13 for loading and ejecting a disc D is formed on the front face of the case 1.

Reference numeral 2 denotes a drive unit, which is commonly referred to as a transfer mechanism. This drive unit 2 is constructed by integrally fitting a turntable 22, an optical pickup 23, and so forth to a seat plate 21 made of a metal. The turntable 22 is a circular-shaped rotation member for supporting and rotating the disc D. The turntable 22 is directly coupled to a rotor shaft of a spindle motor 24 fixed to the seat plate 21 and is rotated in one direction. The optical pickup 23 is an electronic component unit for reading recorded information in the disc D or writing information into the disc D while moving in a radial direction of the disc D supported by the turntable 22. The optical pickup 23 has, for example, a light emitting element such as laser diode, for generating light to irradiate the disc D's surface, and a photoreceptor element for receiving reflected light from the disc D, as is known.

Reference numeral 25 denotes a clamping disk for rotatably clamping the disc D in cooperation with the turntable 22. A clamping base 26 retains the clamping disk 25 rotatably. One end portion of the clamping base 26 is pivotably supported by a bracket 21a formed on the seat plate 21. Thereby, the clamping disk 25 retained by the clamping base 26 is set at a standby position as shown in FIG. 1 and the clamping disk 25 can descend from the standby position to a clamp position for clamping the disc D on the turntable 22.

Figure 2:
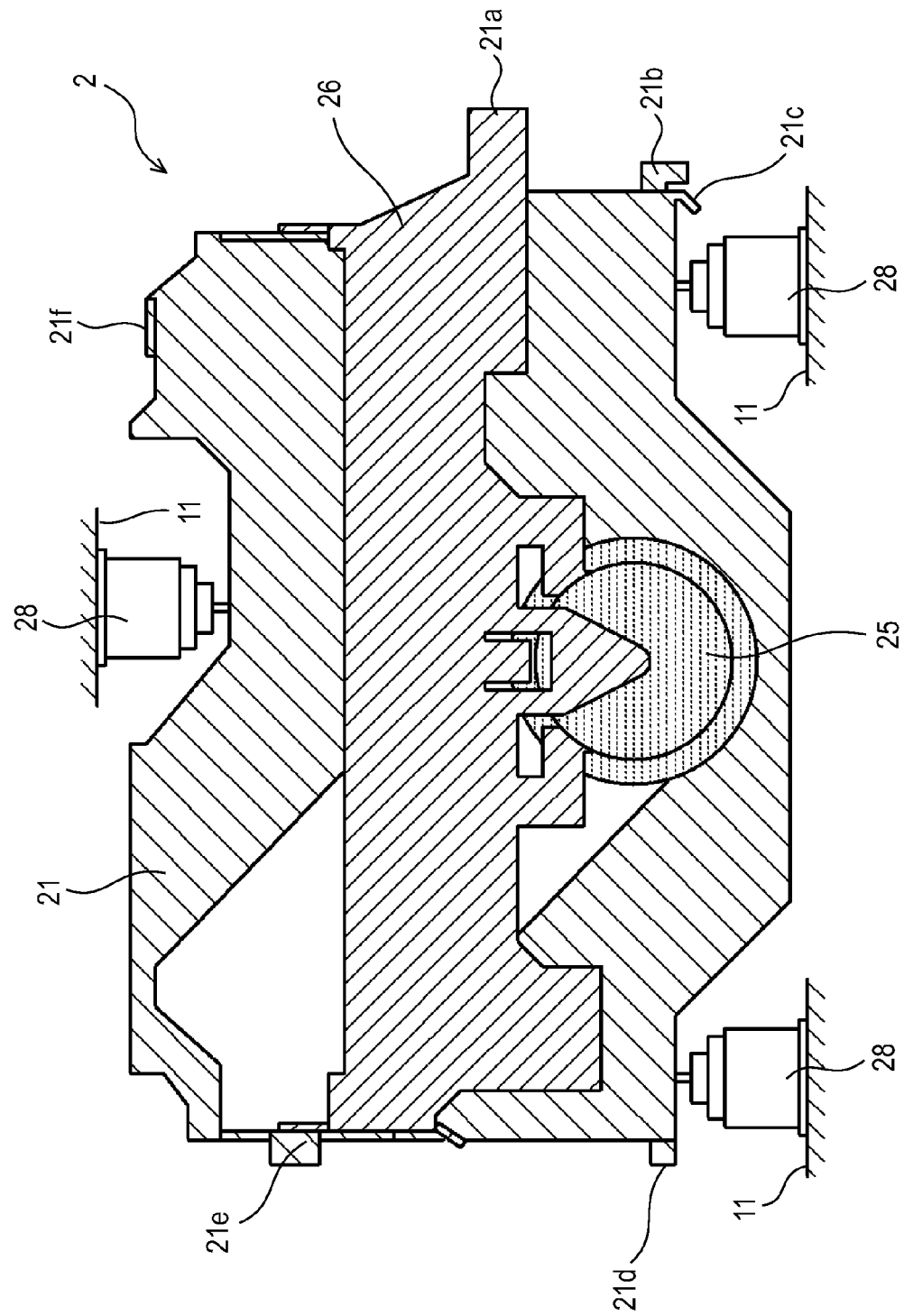
FIG. 2 shows a schematic plan view of the drive unit.

The clamping disk 25 is urged to the clamp position by a spring 27 hooked between the seat plate 21 and the clamping base 26. As shown in FIG. 2, a cam follower portion 26a jutting out from one end is formed in the clamping base 26. The cam follower portion 26a is pressed upward by an external force and thereby the clamping disk 25 is retained at the standby position. The seat plate 21 is elastically supported to the base chassis 11 via anti-vibration dampers 28, whereby the dropout and the like of the reproduced sound in disc driven can be reduced. As shown in FIG. 2, the seat plate 21 has two end pieces 21b and 21c protruding from one peripheral end so as to be formed adjacent to each other and in a staggered manner. Two end pieces 21d and 21e are formed horizontally on the other end of the seat plate 21 so as to be spaced apart in the front and the rear. In addition, at the rear edge of the seat plate 21, an end piece 21f bent upwardly is formed.

Reference numeral 3 denotes a disc transfer mechanism for transferring a disc D, which is positioned between the drive unit 2 and the slot 13 formed in the case 1. The disc transfer mechanism 3 includes a feed roller 31 that is rotated in obverse and reverse directions and a guide plate 32 fitted to the top plate 12.

The feed roller 31 is a long slim rubber roller having substantially the same length as the diameter of the disc D (for example, 12 cm). The feed roller 31 is disposed between the drive unit 2 and the insert slot 13. Both ends of a rotation shaft 31a (hereinafter referred to as a roller shaft) are supported rotatably by a roller supporting member 33.

The roller supporting member 33 is a sheet metal member in which a pair of left and right brackets 33a (FIG. 1 depicts only one bracket 33a) for rotatably supporting the feed roller 31 are formed. One end of each of the brackets 33a is retained by the base chassis 11 via a pivot shaft 33b parallel to the roller shaft 31a. Thus, the feed roller 31 supported by the other end of the brackets 33a is allowed to be pivotable in vertical directions between an evacuated position indicated by dash-dotted line and a disc transfer position indicated by solid line in FIG. 1, so as to pivot around the pivot shaft 33b. At the disc transfer position indicated by solid line, it is possible to transfer the disc D between the feed roller 31 and the guide plate 32. At the disc transfer position, the feed roller 31 is allowed to transfer the disc D by clamping the disc D between the feed roller 31 and the guide plate 32.

The feed roller 31 is urged toward the disc transfer position by a spring 34 hooked between the roller supporting member 33 and the base chassis 11. When the disc D is guided to the turntable 22, the feed roller 31 is pressed downward by a later-described drive cam toward the evacuated position against the urging force of the spring 34. At the time point when the disc D is placed on the turntable 22, the feed roller 31 is at the evacuated position and is moving away from the disc D. Conversely, when transferring the disc D, the urging force of the spring 34 acts as the force for pressing the feed roller 31 against the disc D.

Figure 3:
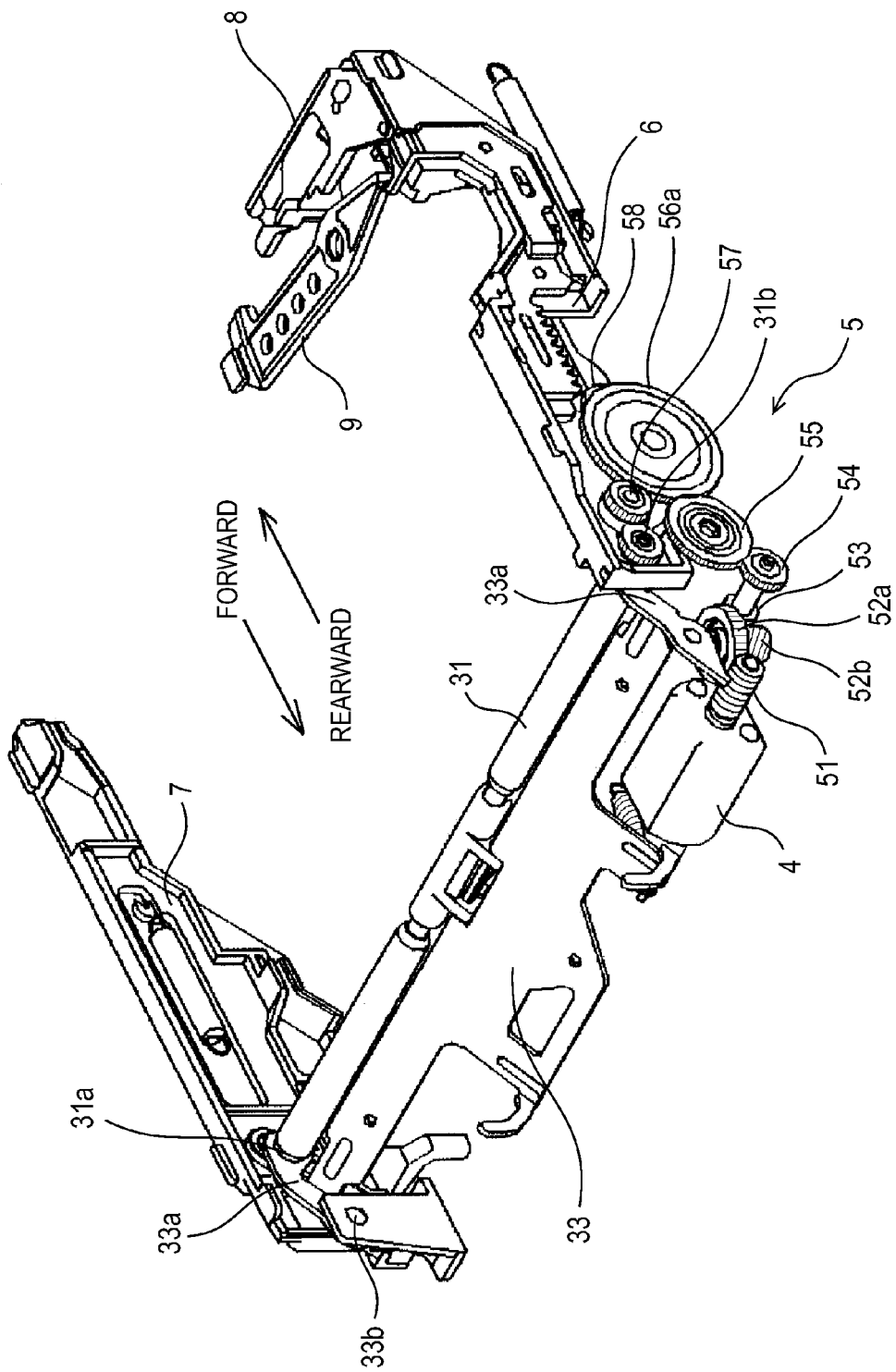
FIG. 3 shows a perspective view illustrating an embodiment of the disc transfer mechanism.

Next, in FIG. 3, reference numeral 4 denotes a motor (drive source) driving the feed roller 31 in obverse and reverse directions. Reference numeral 5 denotes a gear transmission unit for transmitting the motive power of the motor 4 to the feed roller 31. Reference numeral 6 denotes the above-mentioned drive cam. The motive power of the motor 4 is transmitted also to the drive cam 6 through the gear transmission unit 5.

Figure 4:
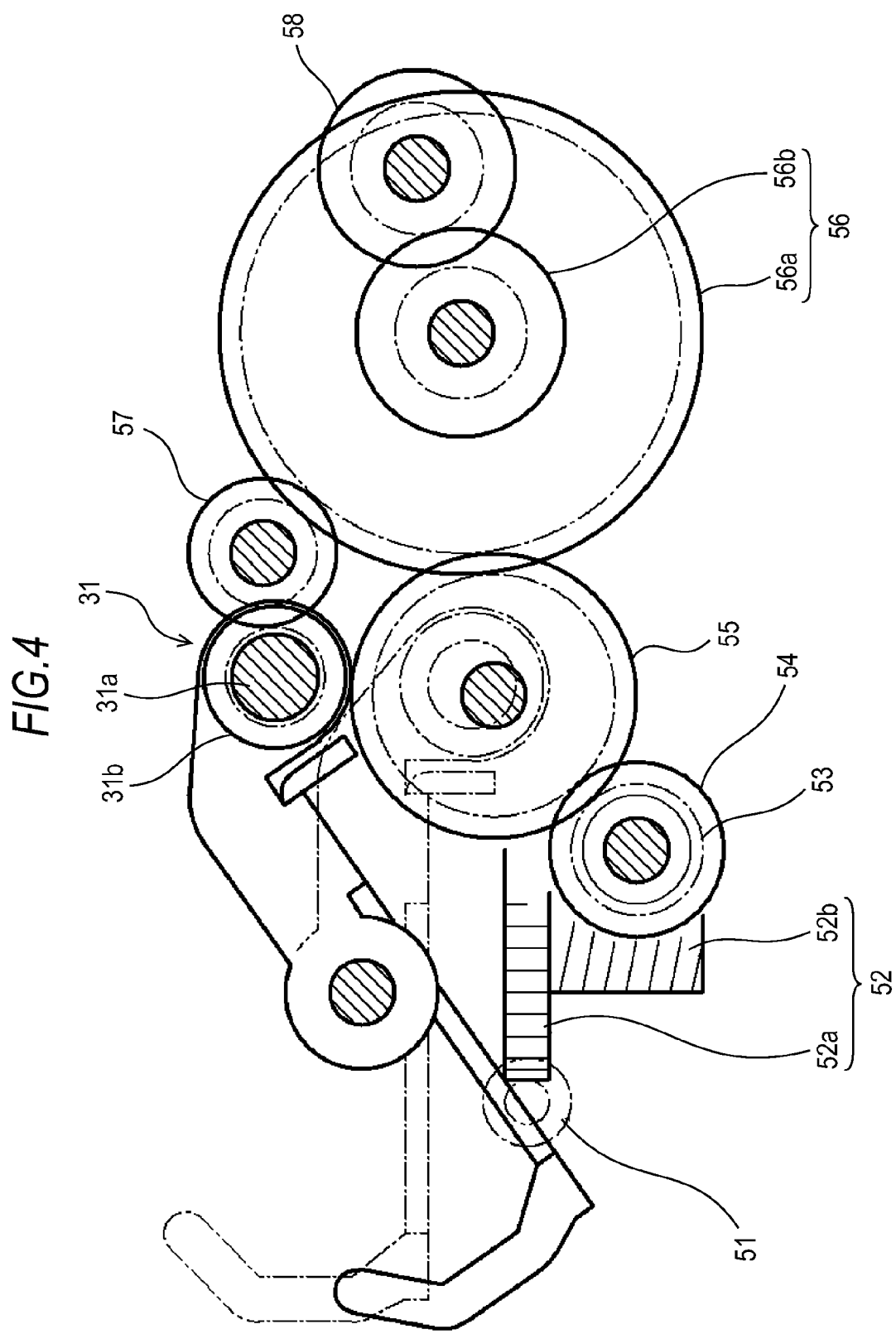
FIG. 4 shows a side view illustrating the power transmission system of the disc transfer mechanism.

As shown clearly in FIGS. 3 and 4, the gear transmission unit 5 includes: a worm 51 fitted to a drive shaft of the motor 4, a two-stage gear 52 having a worm wheel portion 52a that meshes with the worm 51, a worm wheel 53 that meshes with a worm portion 52b of the two-stage gear 52, a gear 54 secured to the same shaft as that of the worm wheel 53, a gear 55 that meshes circumferentially with the gear 54, a two-stage gear 56 having a larger-diameter gear portion 56a that meshes circumferentially with the gear 55, a gear 57 that meshes circumferentially with the larger-diameter gear portion 56a, and a gear 58 that meshes circumferentially with a smaller-diameter gear portion 56b of the two-stage gear 56. A driven gear 31b is secured to one end of the roller shaft 31a. When the feed roller 31 is pivoted to the disc transfer position indicated by solid line in FIG. 4, the driven gear 31b meshes with the gear 57 so that rotation-driving of the feed roller 31 is carried out. The gear 58 is a pinion provided corresponding to a later-described rack member. The rectilinear movement of the drive cam 6 is performed by meshing the gear 58 and the rack member with each other.

Figure 5:
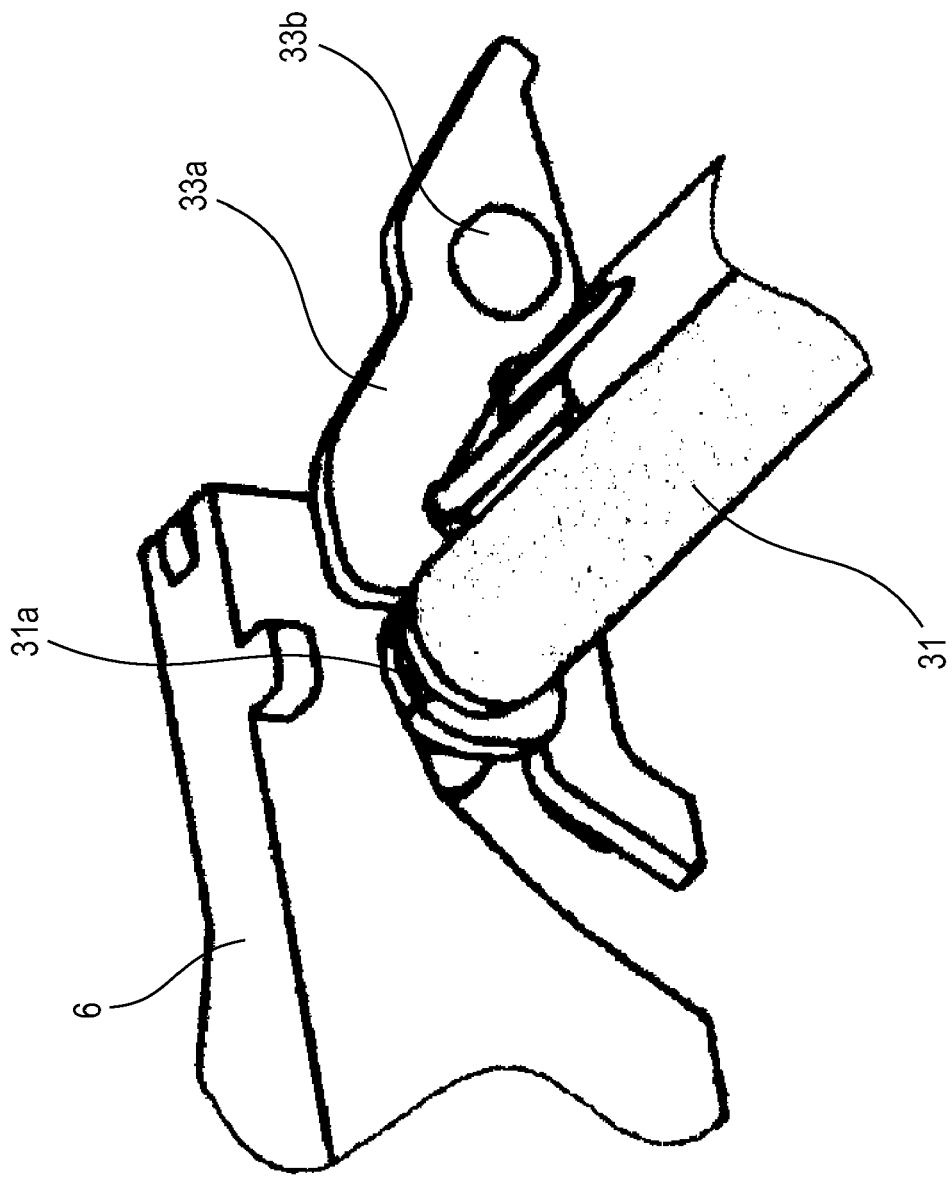
FIG. 5 shows a perspective view illustrating one end of a feed roller and an adjacent portion thereto.
Figure 6:
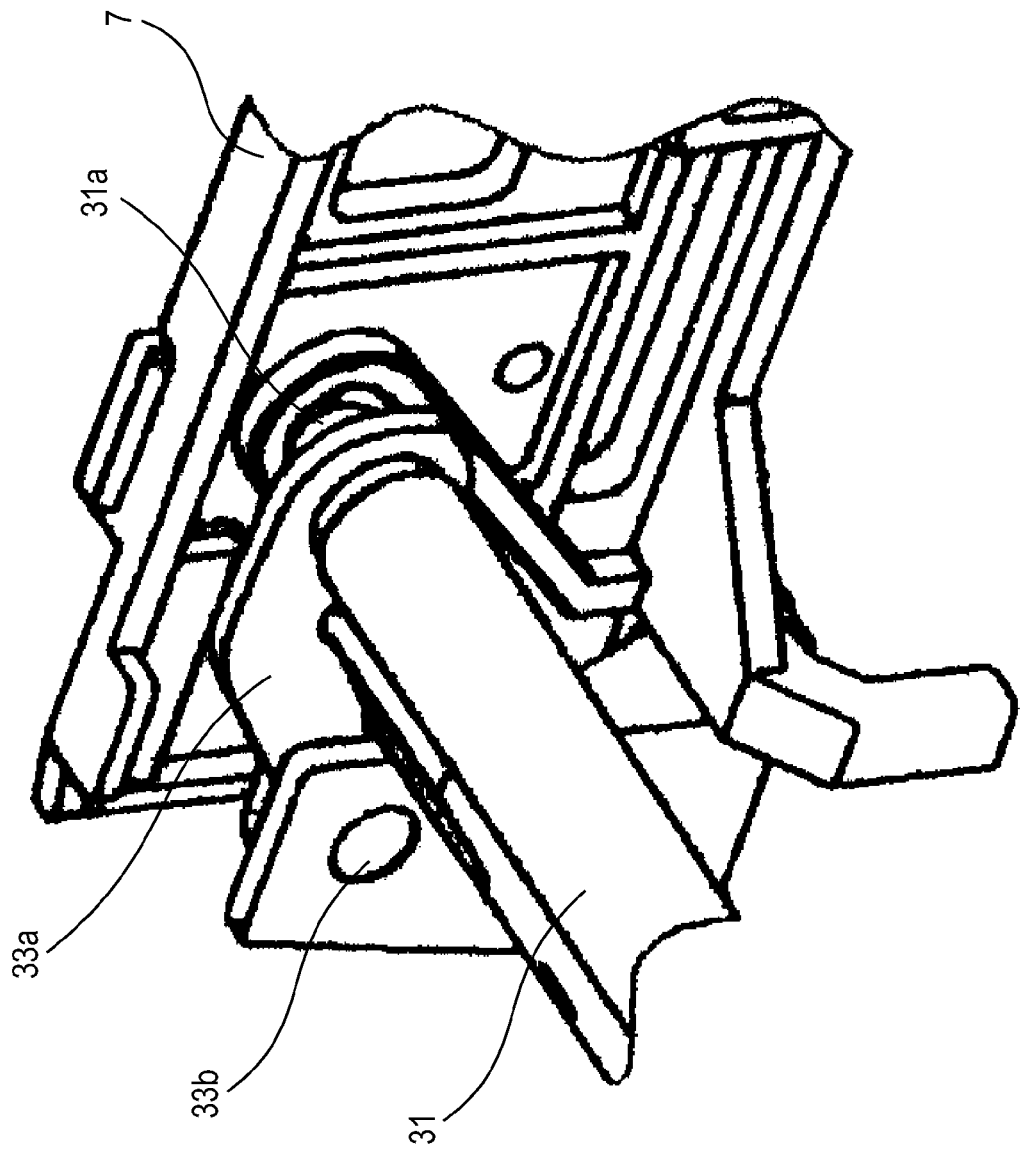
FIG. 6 shows a perspective view illustrating the other end of the feed roller and an adjacent portion thereto.

As illustrated in FIG. 3, the drive cam 6 is disposed so as to be perpendicular to the feed roller 31 and one end of the drive cam 6 is engaged with one end of the roller shaft 31a portion as shown in FIG. 5. As shown clearly in FIG. 3, a driven cam 7 is opposed to the drive cam 6 with respect to the axial direction of the feed roller 31 and one end portion of the driven cam 7 is likewise engaged with the other end of the roller shaft 31a as illustrated in FIG. 6.

The disc transfer mechanism 3 according to embodiments is configured as follows. The feed roller 31 is pivoted up and down between the disc transfer position and the evacuated position by the rectilinear movement of the drive cam 6 in the forward and rearward directions and the rectilinear movement of the driven cam 7 in the forward and rearward directions is performed in cooperation with the pivoting movement. In the embodiments, the feed roller 31 is used as a line shaft for transmitting motive power from the drive cam 6 to the driven cam 7, whereby the linked movement between the drive cam 6 and the driven cam 7 is achieved.

Figure 7:
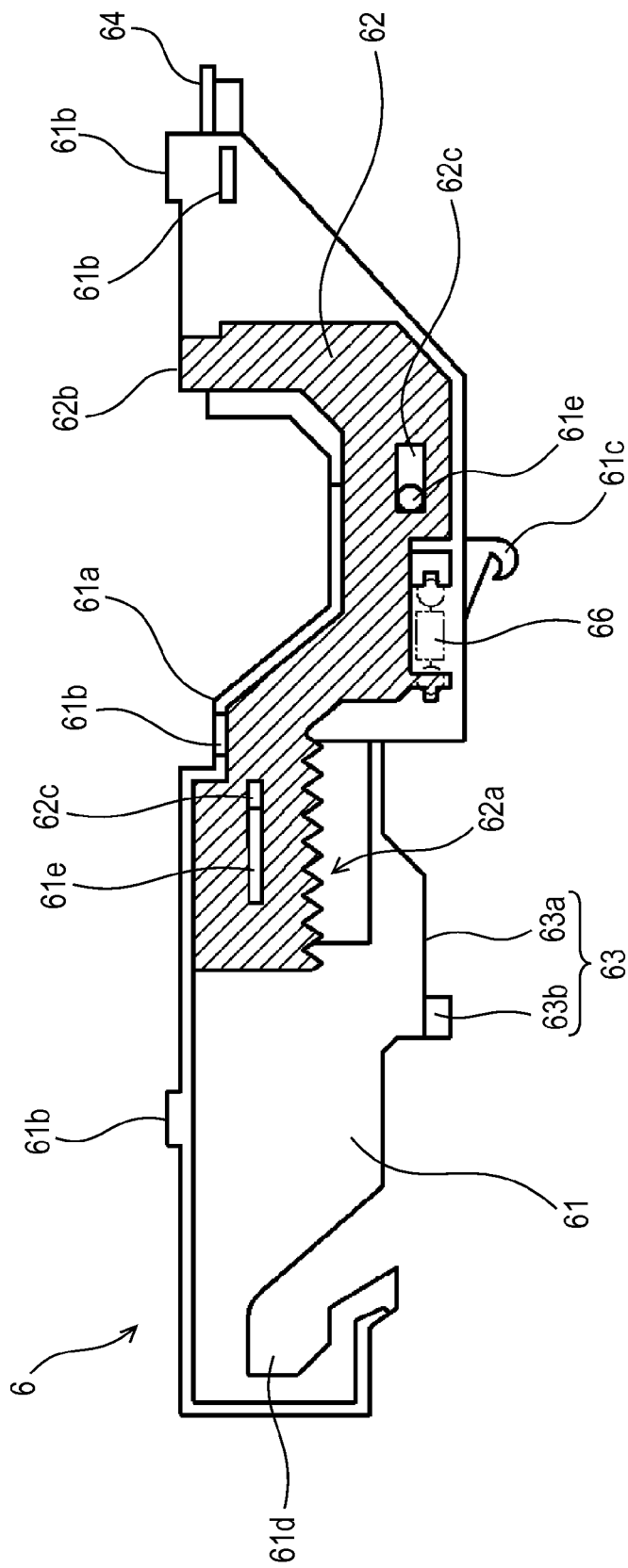
FIG. 7 shows a right side view of the drive cam.

FIG. 7 shows the structure of the drive cam 6. As illustrated in FIG. 7, the drive cam 6 includes a cam main body 61 and the above-mentioned rack member 62, which is indicated by hatching. The cam main body 61 is an integrally formed product of synthetic resin. The upper portion of the cam main body 61 is cut away in a predetermined shape, as a cam contour portion 61*a* for causing the clamp disk 25 shown in FIG. 1, to ascend and descend. Protruding portions 61*b* are formed in the upper end side and one side of the cam main body 61. The protruding portions 61*b* are inserted in long holes, which are not shown in the figures, formed in the case 1 and are supported slidably so that the drive cam 6 as a whole can moves rectilinearly in the longitudinal directions (in the left-right directions in FIG. 7).

Figure 8:
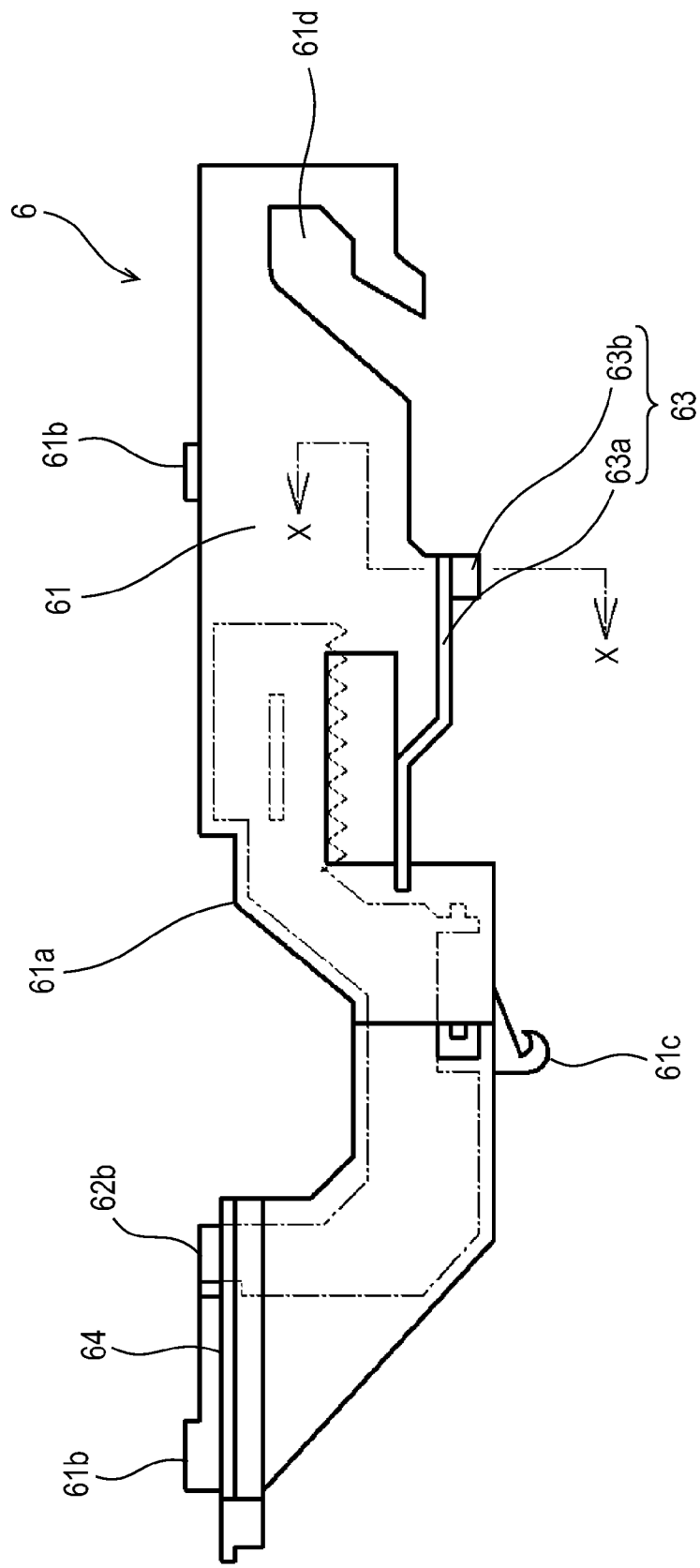
FIG. 8 shows a left side view of the drive cam.
Figure 9:
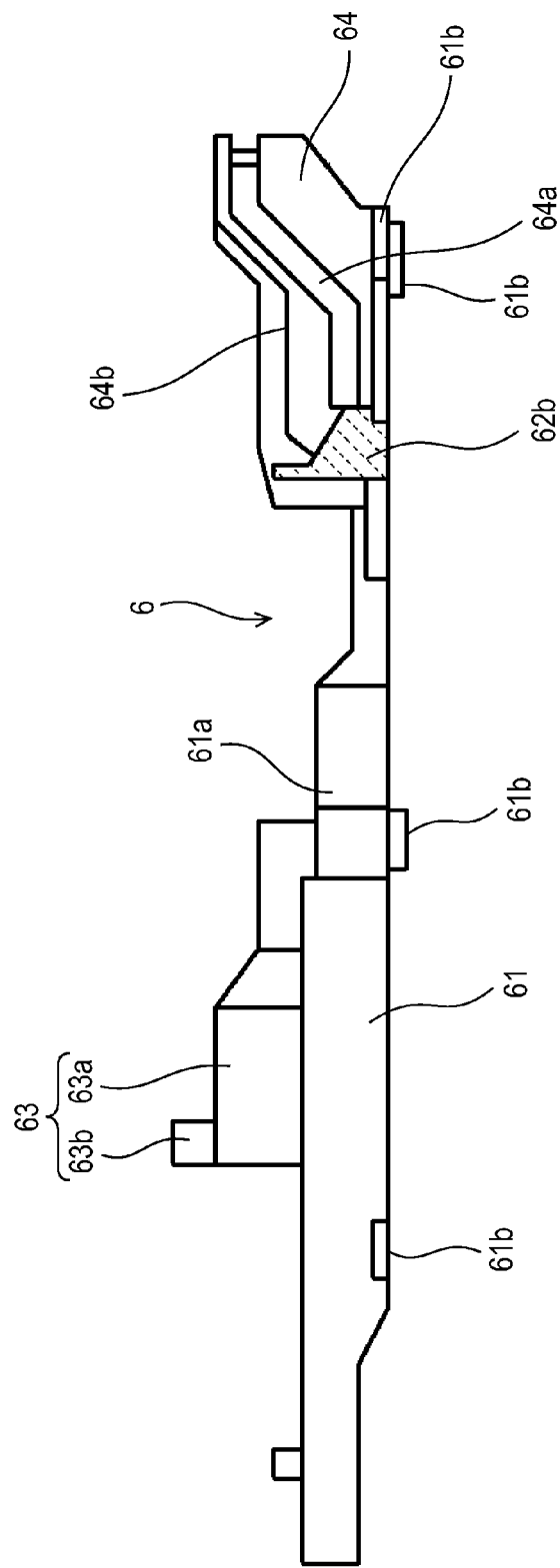
FIG. 9 shows a plan view of the drive cam.
Figure 10:
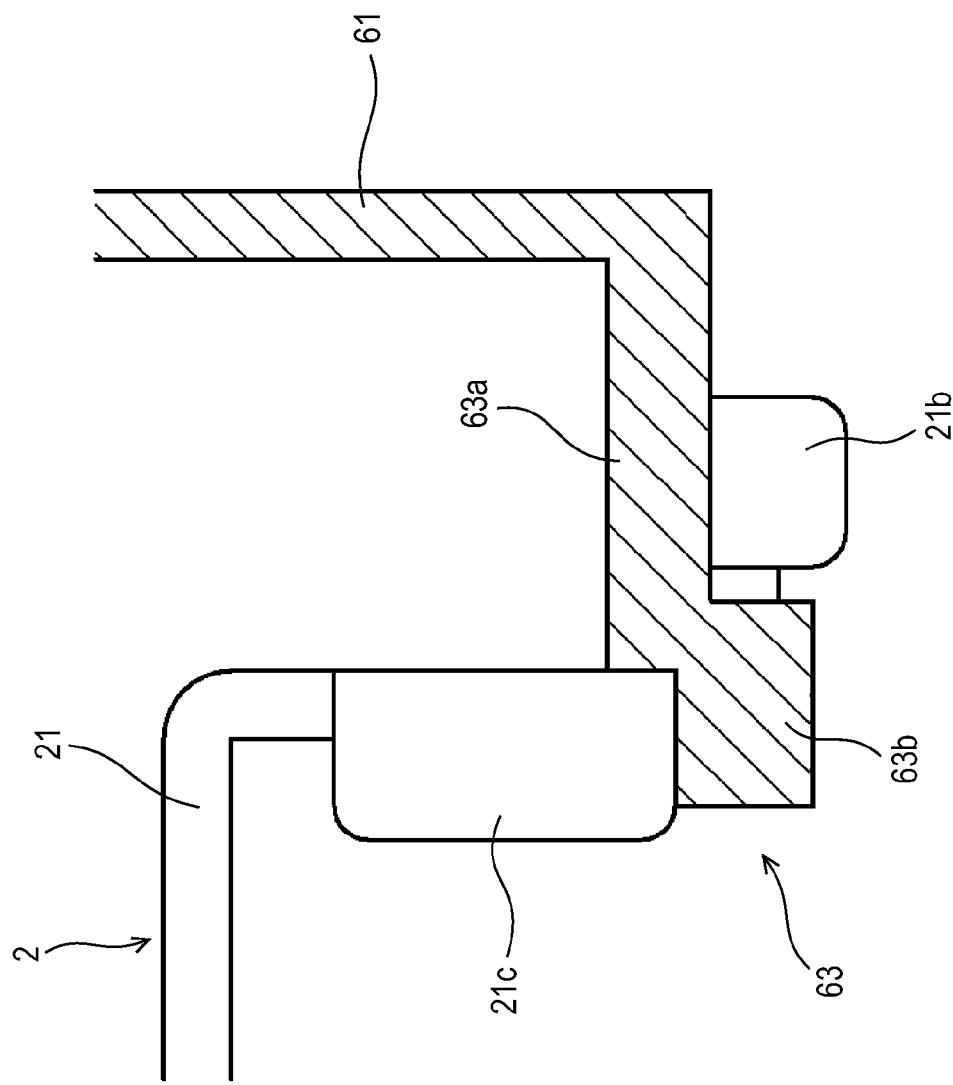
FIG. 10 shows an illustrative view illustrating a cross section of the drive cam taken along line X-X in FIG. 8 and a region of the drive unit.

As illustrated in FIGS. 7 to 9, a unit-securing-and-supporting portion 63 for restraining a part of the drive unit 2 is formed in one lower side of the cam main body 61. The unit-securing-and-supporting portion 63 includes a flange 63*a* jutting out in a thickness direction of the cam main body 61, and a protruding piece 63*b* formed connectedly to the bottom face of the flange 63*a*. As illustrated in FIG. 10, when restraining the drive unit 2, the bottom face of the flange 63*a* is brought into close contact with one end piece 21*b* of the end pieces 21*b* and 21*c*, formed on the seat plate 21 of the drive unit 2 (see FIG. 2). The upper face of the protruding piece 63*b* is brought into close contact with the other end piece 21*c*.

In addition, a seat 64 for supporting a later-described lock lever from below is formed at an upper end portion of the cam main body 61. As illustrated in FIG. 9, a cam hole 64*a* and a cam contour portion 64*b* adjacent to the cam hole 64*a* are formed in the seat 64. The workings of the cam hole 64*a* and the cam contour portion 64*b* will be discussed later.

Figure 11:
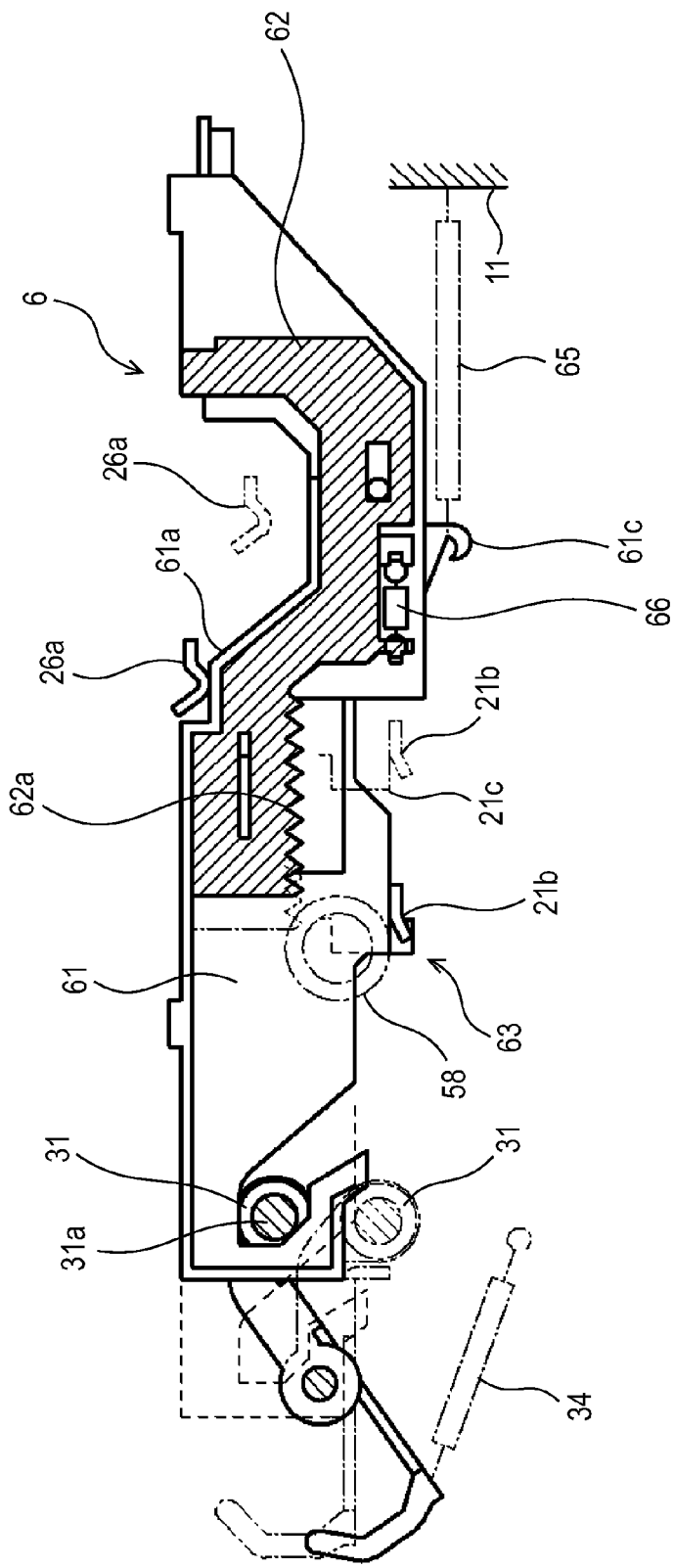
FIG. 11 shows an illustrative view illustrating displacement of the feed roller by shifting of the drive cam.

As described clearly in FIGS. 7 and 8, a hook 61*c* is formed in a lower end portion of the cam main body 61. A cam groove 61*d* inclined with respect to the moving directions of the cam main body 61 is formed in one end portion of the cam main body 61 along the longitudinal direction. As illustrated in FIG. 11, a spring 65 (first elastic member) is hooked on the hook 61*c* between the hook 61*c* and the base chassis 11. Thereby, the cam main body 61 is urged rearward, in a direction opposite the feed roller 31 (i.e., toward one end of the moving direction of the drive cam 6, rightward in FIG. 11), and one end of the roller shaft 31*a* is inserted into the cam groove 61*d*. Thus, the drive cam 6 has the cam groove 61*d* into which one end of the roller shaft 31*a* is inserted and engages with one end of the roller shaft 31*a*. When the drive cam 6 moves rectilinearly toward the feed roller 31 (leftward in FIG. 11) against the urging force of the spring 65, the drive cam 6 presses the feed roller 31 down to the evacuated position along the cam groove 61*d* shown in the dash-dotted line in FIG. 11. When the drive cam 6 moves rectilinearly in a direction away from the feed roller 31 (rightward in FIG. 11), the drive cam 6 can press the upward the feed roller 31 along the cam groove 61*d* and the feed roller 31 can be disc transfer position shown in solid line.

As shown clearly in FIG. 11, when the feed roller 31 moves from the disc transfer position indicated by solid line toward the evacuated position indicated by dash-dotted line, the cam contour portion 61*a* of the drive cam 6 moves in a direction away from the cam follower portion 26*a* of the clamp base. Thereby, the clamp disk 25 moves to the clamp position and at the same time, restraining of the end pieces 21*b* and 21*c* by the unit-securing-and-supporting portion 63 is released.

Referring to FIG. 7, the rack member 62 is arranged on one side of the cam main body 61. A rack 62*a* is formed at one end portion of the rack member 62, and the other end portion thereof is formed into a flange-shaped protruding piece 62*b* and is positioned on the seat 64 of the cam main body 61 illustrated in FIG. 9. The rack member 62 has a guide hole 62*c* for receiving a protruding portion 61*e* formed in the cam main body 61. The rack member 62 is allowed to be slidable forward and rearward along a side of the cam main body 61. In FIG. 7, reference numeral 66 denotes a spring connecting between the cam main body 61 and the rack member 62. By the spring 66, the rack member 62 is urged rearward (rightward in FIG. 7). When there is no disc in the apparatus, the rack member 62 is in the position indicated by solid line in FIG. 11 and is kept in a state in which the rack 62*a* does not mesh with the gear (pinion) 58 of the gear transmission unit. When a disc is loaded to a predetermined position in the apparatus by the feed roller 31, the rack member 62 is moved toward the gear 58 so that the rack 62*a* meshes with the gear 58 that is rotating. Thereby, the rack member 62, while moving leftward in FIG. 11 together with the cam main body 61, presses the feed roller 31 downward to the evacuated position. When ejecting a disc, the reverse rotation of the gear 58 that is in mesh with the rack 62*a* causes the drive cam 6 to move from the position indicated by dotted line in FIG. 11 to the position indicated by solid line. As a result, the feed roller 31 is shifted from the evacuated position to the disc transfer position, and at the time when the feed roller 31 reaches the disc transfer position, the rack 62*a* is disengaged from the gear 58. When the rack 62*a* is disengaged from the gear 58, the cam main body 61 is pulled back by the spring 65 to the position at which the rack 62*a* is completely disengaged from the gear 58, and in addition, the elastic force of the springs 65 and 34 acts in a direction in which the feed roller 31 is pressed against the disc through the cam groove 61*d*. Thus, while the spring 34 with a small spring constant is used, the feed roller 31 can be firmly pressed against the disc by the workings of the two springs 65 and 34, so that the disc can be transferred appropriately.

Figure 12:
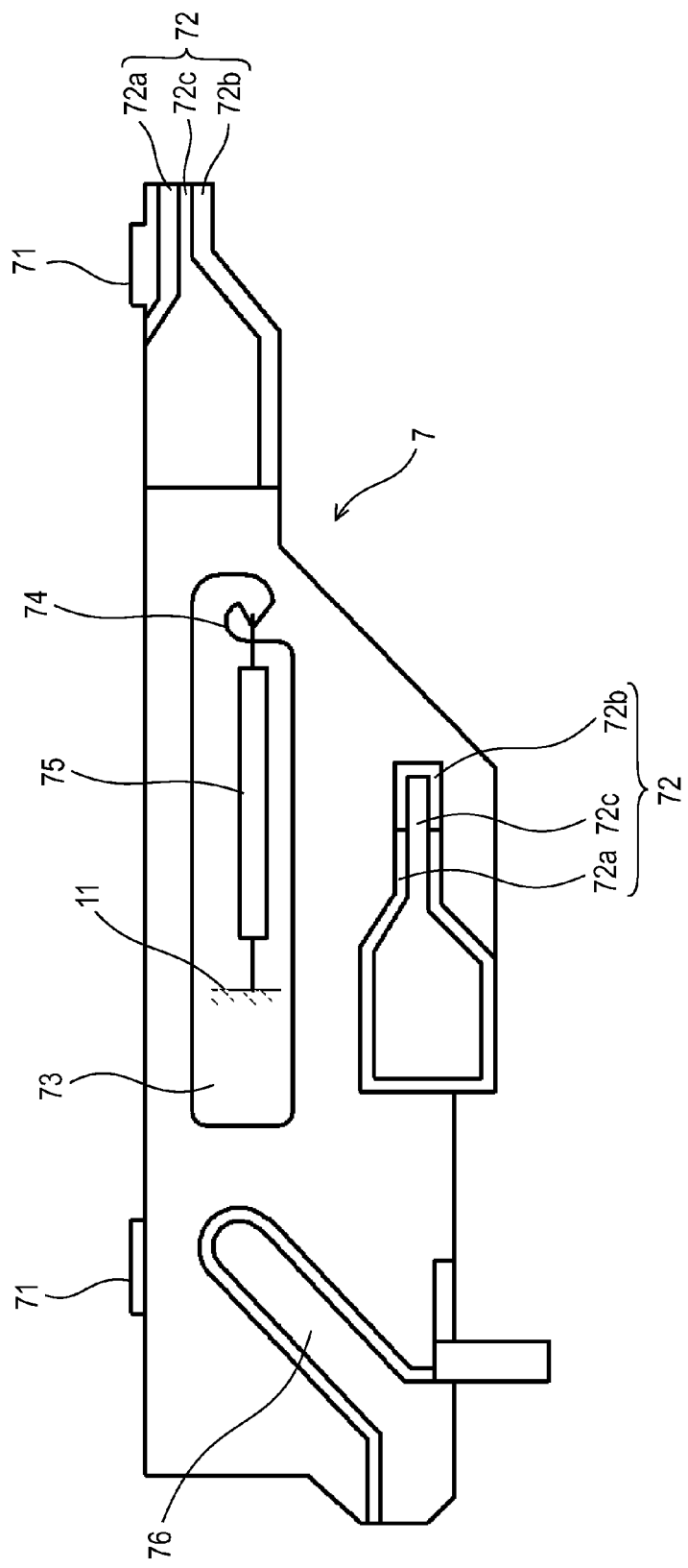
FIG. 12 shows a right side view of the driven cam.
Figure 13:
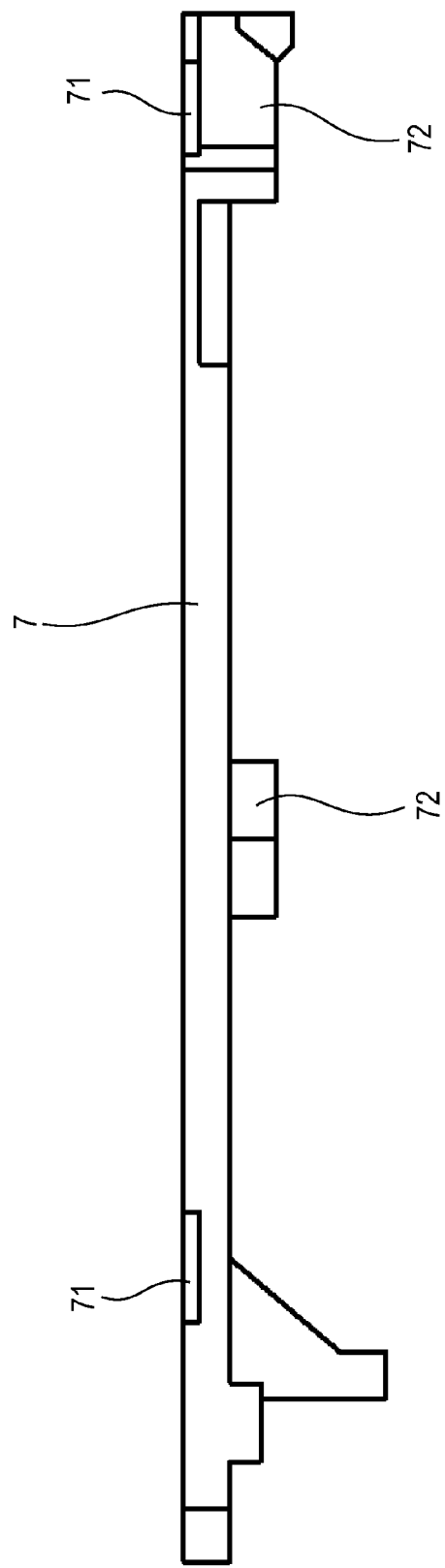
FIG. 13 shows a plan view of the driven cam.
Figure 14:
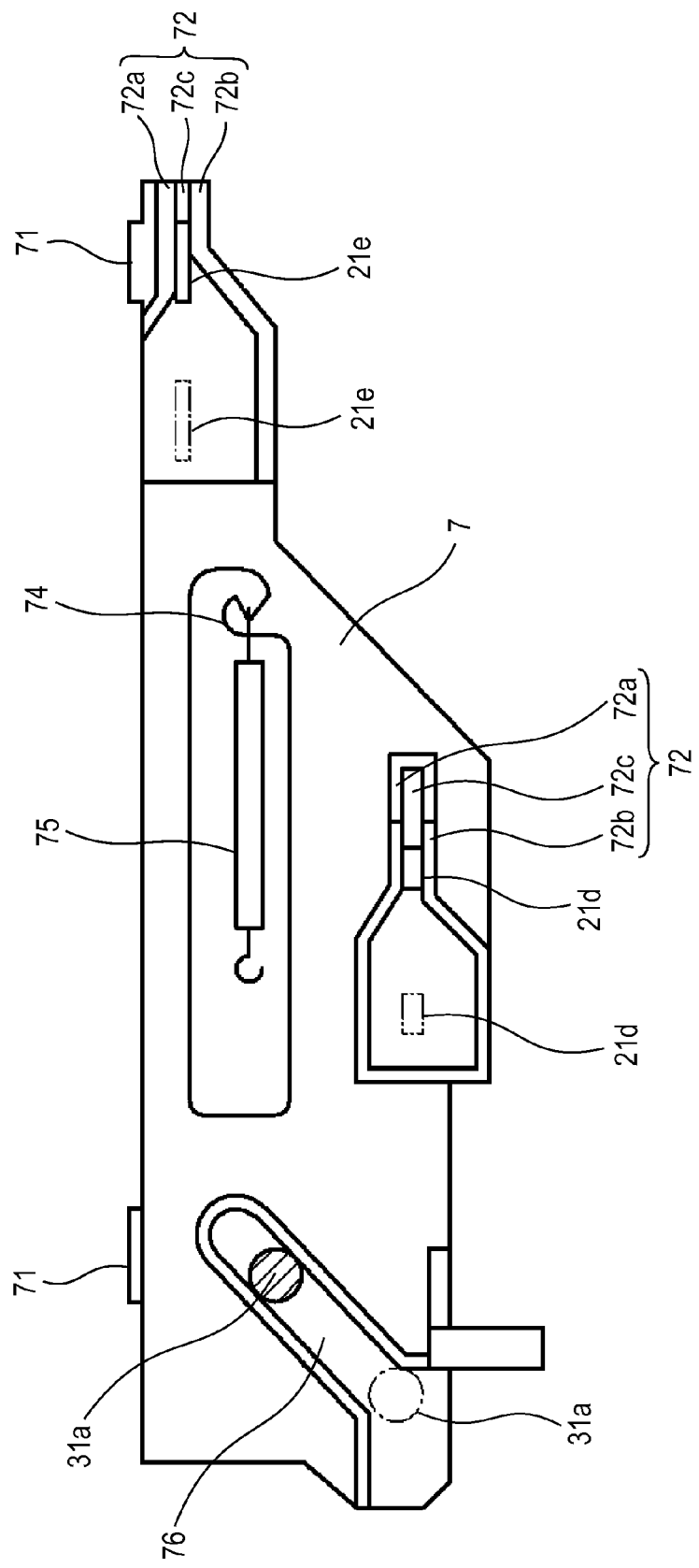
FIG. 14 shows an illustrative view illustrating the positional relationship of interlocking between the feed roller and the driven cam.

Next, referring to FIGS. 12 to 14, the structure of the driven cam 7 is described. Two protruding portions 71 are formed in the upper end face of the driven cam 7 so that the protruding portions 71 are inserted in and slidably supported by a long hole (not shown) formed in the apparatus main body (the top plate 12 shown in FIG. 1). Thereby, the driven cam 7 is allowed to move rectilinearly in the longitudinal directions (the left-right directions in FIGS. 12 to 14).

The driven cam 7 has two unit-securing-and-supporting portions 72 for restraining portions of the drive unit 2 shown in FIG. 2. Each of the unit-securing-and-supporting portions 72 includes a pair of flanges 72*a* and 72*b* opposed vertically to each other. The flanges 72*a* and 72*b* form a slit 72*c* with a narrow gap at one end, and the flanges 72*a* and 72*b* widen in a V shape at the other end. As illustrated in FIG. 14, when the feed roller 31 (the roller shaft 31*a*) is at the disc transfer position indicated by the solid line, the end pieces 21*d* and 21*e* of the drive unit (see FIG. 2) are fitted into the slit 72*c* and are restrained. When the feed roller 31 (the roller shaft 31*a*) is shifted to the evacuated position indicated by dash-dotted line, the end pieces 21*d* and 21*e* exit from the slit 72*c* so that the end pieces 21*d* and 21*e* are released from the restrained condition.

In addition, as illustrated in FIGS. 12 and 14, an opening 73 extending in the longitudinal direction of the driven cam 7 is formed in the driven cam 7 and a hook 74 is formed at one end of the opening 73. A spring 75 (the second elastic member) is hooked between the hook 74 and the base chassis 11 and by the spring 75, the driven cam 7 is urged toward the front side, where the feed roller 31 is located (i.e., toward one end of the moving direction of the driven cam 7, leftward in FIGS. 12 and 14).

In particular, an inclined cam groove 76, to which one end of the roller shaft 31a is to be inserted, is formed at one end of the driven cam 7. The cam groove 76 has a shape such as to be inclined in the opposite direction to the inclination direction of the cam groove 61d of the drive cam 6 (see FIG. 7) so that the height gradually increases toward the rear.

Thus, the driven cam 7 has the cam groove 76 into which one end of the roller shaft 31a is to be inserted, so that the driven cam 7 engages with one end of the roller shaft 31a. When the roller shaft 31a is pressed by the drive cam 6 downward from the disc transfer position in FIG. 14, the driven cam 7 is moved rightward in FIG. 14 by the pressing of the roller shaft 31a to the lower edge of the cam groove 76. When the feed roller 31 returns to the disc transfer position, the driven cam 7 moved by the pressing of the roller shaft 31a to the upper edge of the cam groove 76 (leftward in FIG. 14). In particular, when the feed roller 31 returns to the disc transfer position, the elastic force of the spring 75 acts in a direction in which the feed roller 31 is pressed against the disc through the lower edge of the cam groove 76. Thus, with the use of the driven cam 7, the feed roller 31 can be firmly pressed against the disc by the two spring 75 and 34, which is a small spring constant (see FIG. 11), so that the disc can be transferred appropriately, as in the case with the drive cam 6. It is preferable that the driven cam 7 be configured to function, the urging force of the spring 75 acts in a direction in which the feed roller 31 is directed toward the disc transfer position, however, the driven cam 7 may not be configured in such a manner. Here, the driven cam 7 moves in an opposite direction to the drive cam 6 in synchronization with the drive cam 6.

Figure 15:
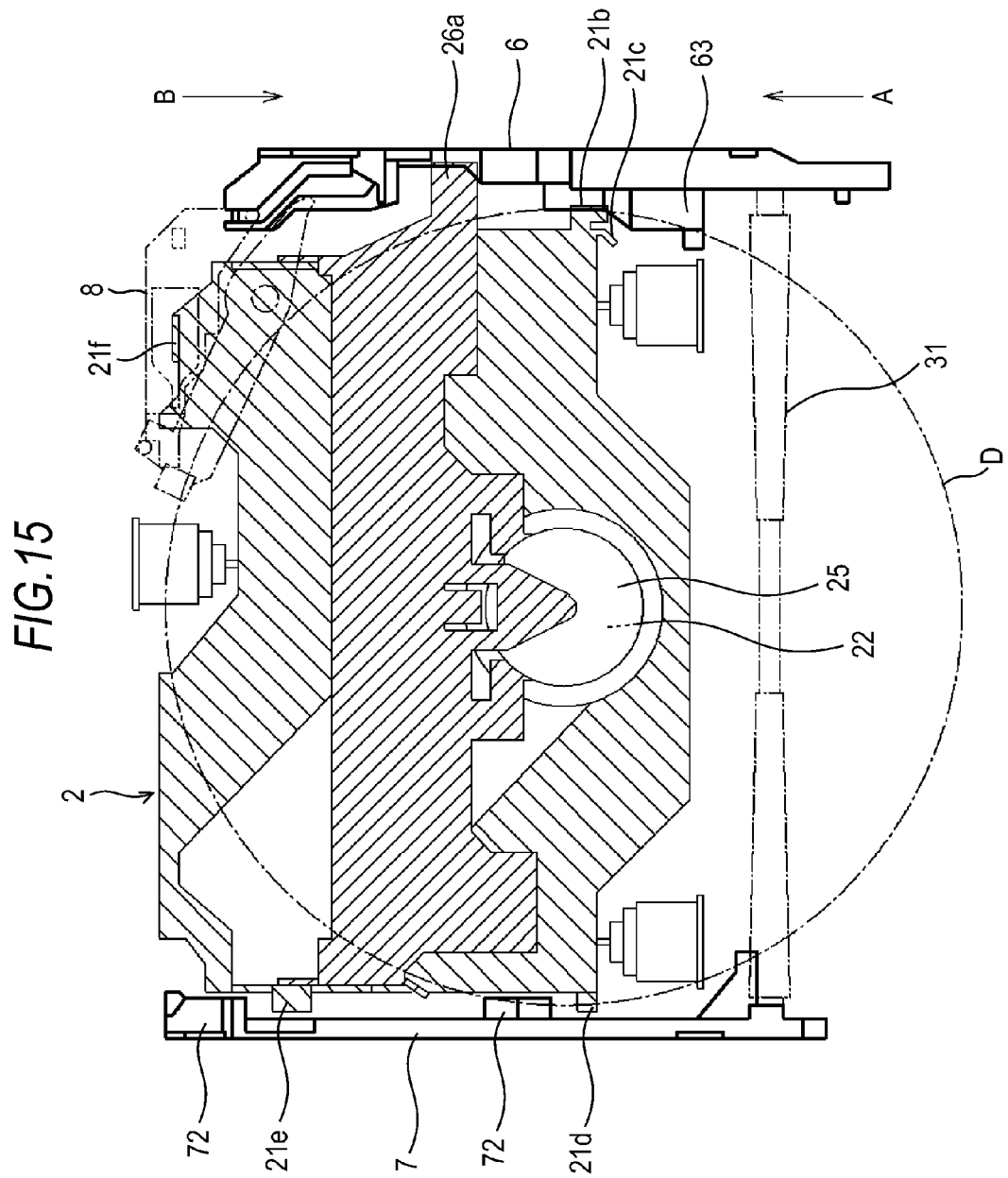
FIG. 15 shows an illustrative view illustrating the positional relationship among the drive unit, the drive cam, and the driven cam (in disc rotation driving).

More specifically, the disc D is loaded along the disc loading direction in FIG. 15 by the feed roller 31 to a predetermined position in the apparatus (to the position at which the center of the disc D matches the axis line of the turntable 22). Thereafter, the drive cam 6 moves in a disc ejecting direction B that is opposite the disc loading direction A. Accordingly, the driven cam 7 moves in the disc loading direction A. Conversely, when the disc D ejected from the apparatus, the drive cam 6 moves in the disc loading direction A and the driven cam 7 moves in the disc ejecting direction B. Then, at the time point at which the ejection of the disc D has been completed, the end pieces 21b, 21c, 21d, and 21e of the drive unit 2 are restrained by the unit-securing-and-supporting portions 63, 72 and the like illustrated in FIG. 16 and, thereafter, the restrained condition is maintained until the disc D is loaded to a predetermined position in the apparatus. Note that, as shown clearly in FIGS. 15 and 16, the drive cam 6 and the driven cam 7 are opposed across the drive unit 2 and the drive cam 6 and the driven cam 7 are configured to be movable frontward and rearward (in the top-bottom directions in FIGS. 15 and 16) along the respective one peripheral end of the drive unit 2.

Figure 16:
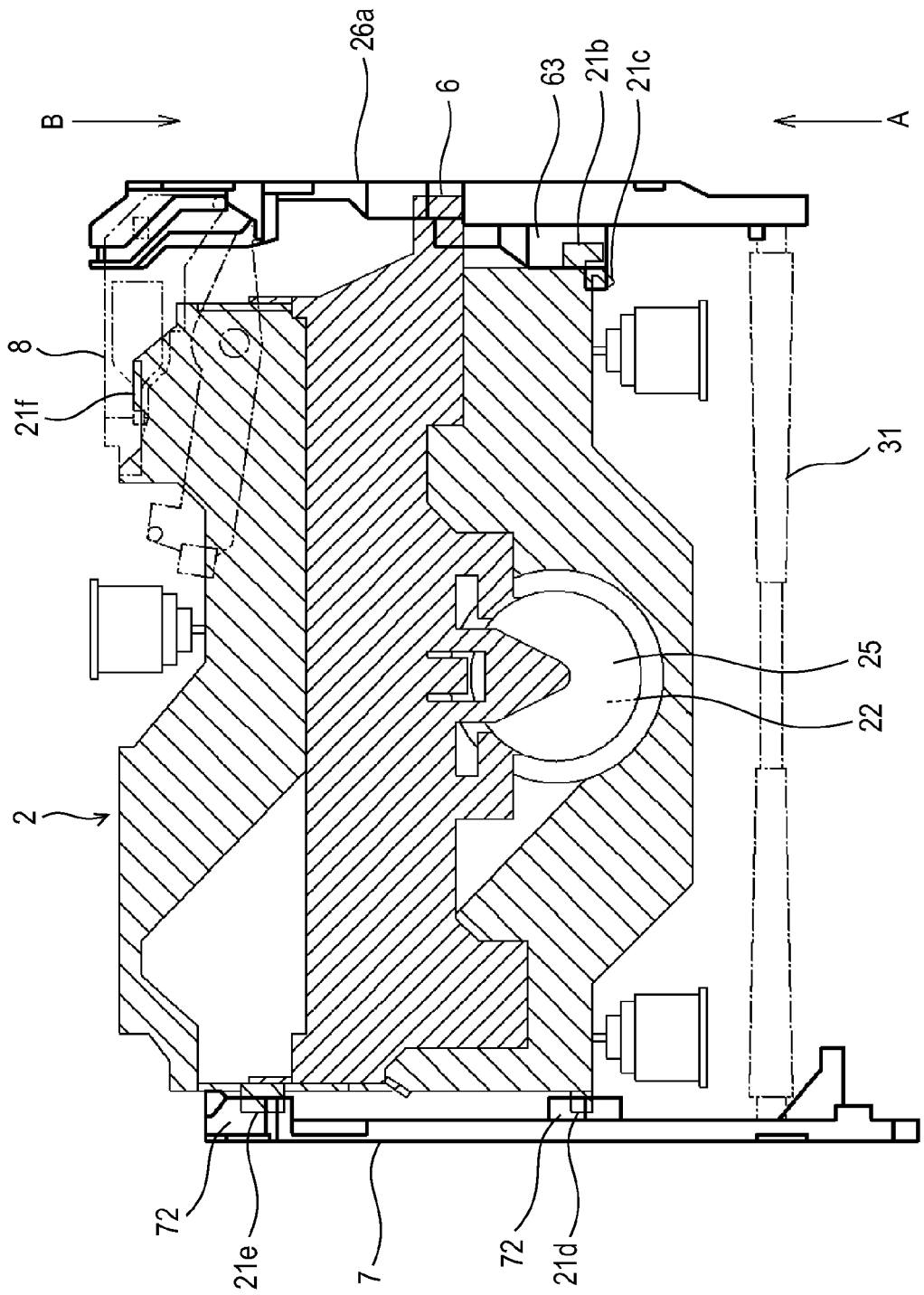
FIG. 16 shows an illustrative view illustrating the positional relationship among the drive unit, the drive cam, and the driven cam (in disc ejecting).

Here, an additional explanation about the structure and operations related to the restraining for the drive unit 2 is made. In FIGS. 15 and 16, reference numeral 8 denotes a lock lever for restraining the end piece 21f of the drive unit (see FIG. 2). The lock lever 8 is configured to be slidable along the bottom face of the top plate 12 shown in FIG. 1 in directions orthogonal to the moving directions of the drive cam 6 (the left-right directions in FIGS. 15 and 16).

Figure 17:
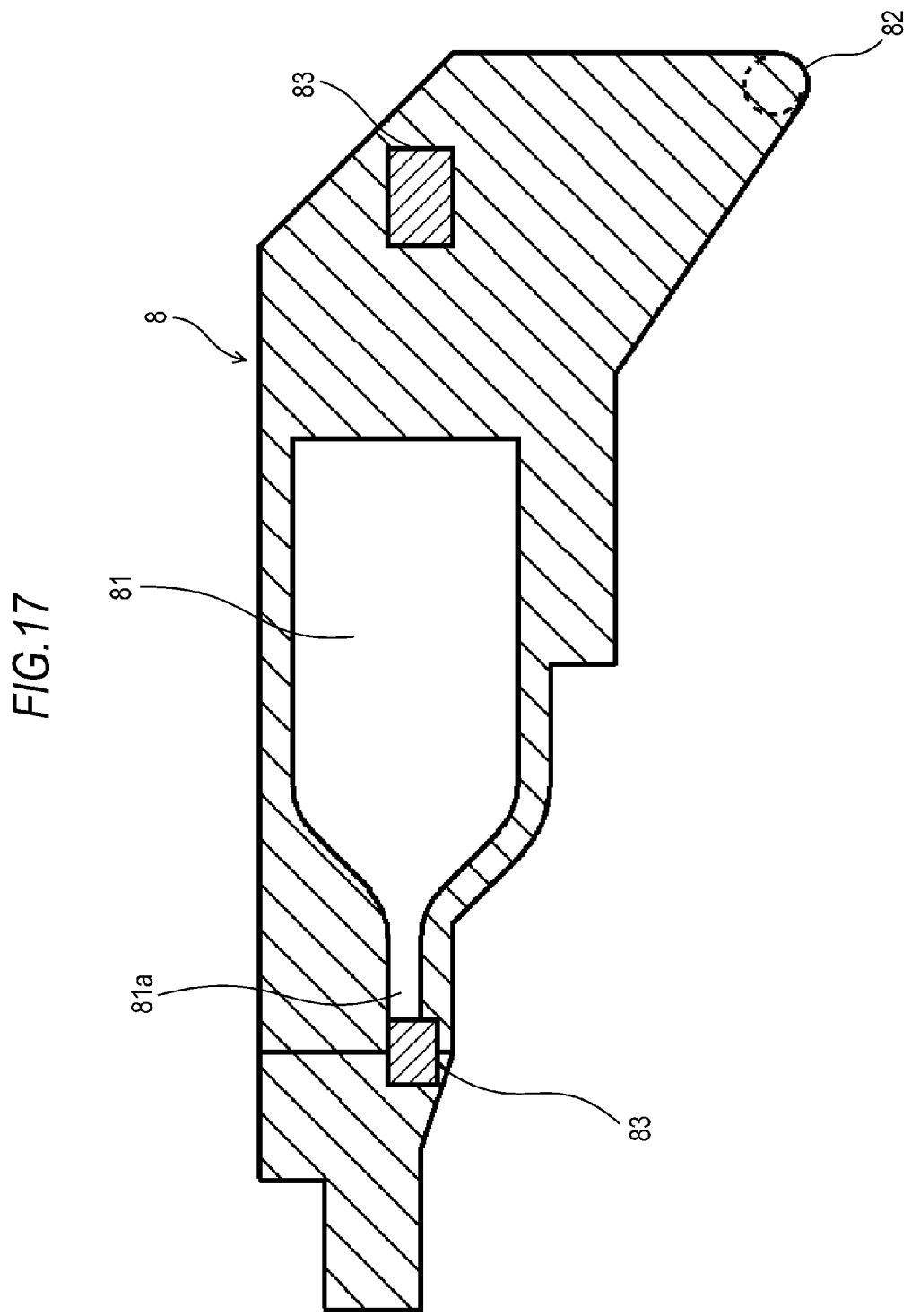
FIG. 17 shows a plan view of a lock lever for restraining a portion of the drive unit.

As described clearly in FIG. 17, an opening 81 is formed at a central portion of the lock lever 8, and one end of the opening 81 is formed into a narrow slit 81a. A slide pin 82 protruding downward is formed at one end of the lock lever 8. Reference numeral 83 denotes a protuberance formed in the upper face of the lock lever 8. The protuberance 83 fits into a guide hole, which is not shown in the figure, formed in the top plate 12 so as to be guided when shifting.

Figure 18:
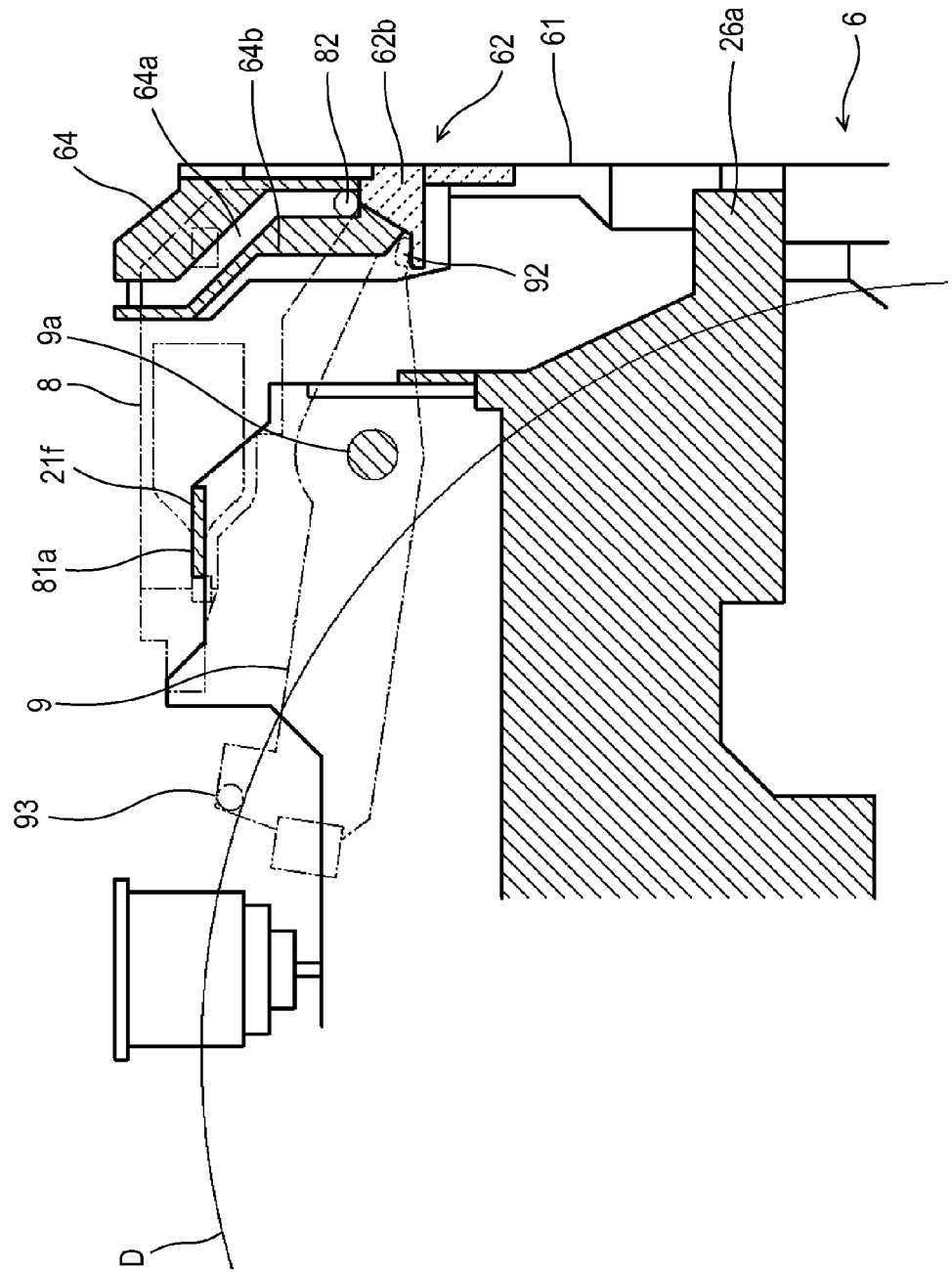
FIG. 18 shows a partially enlarged view illustrating the condition in which a portion of the drive unit is restrained by the lock lever.
Figure 19:
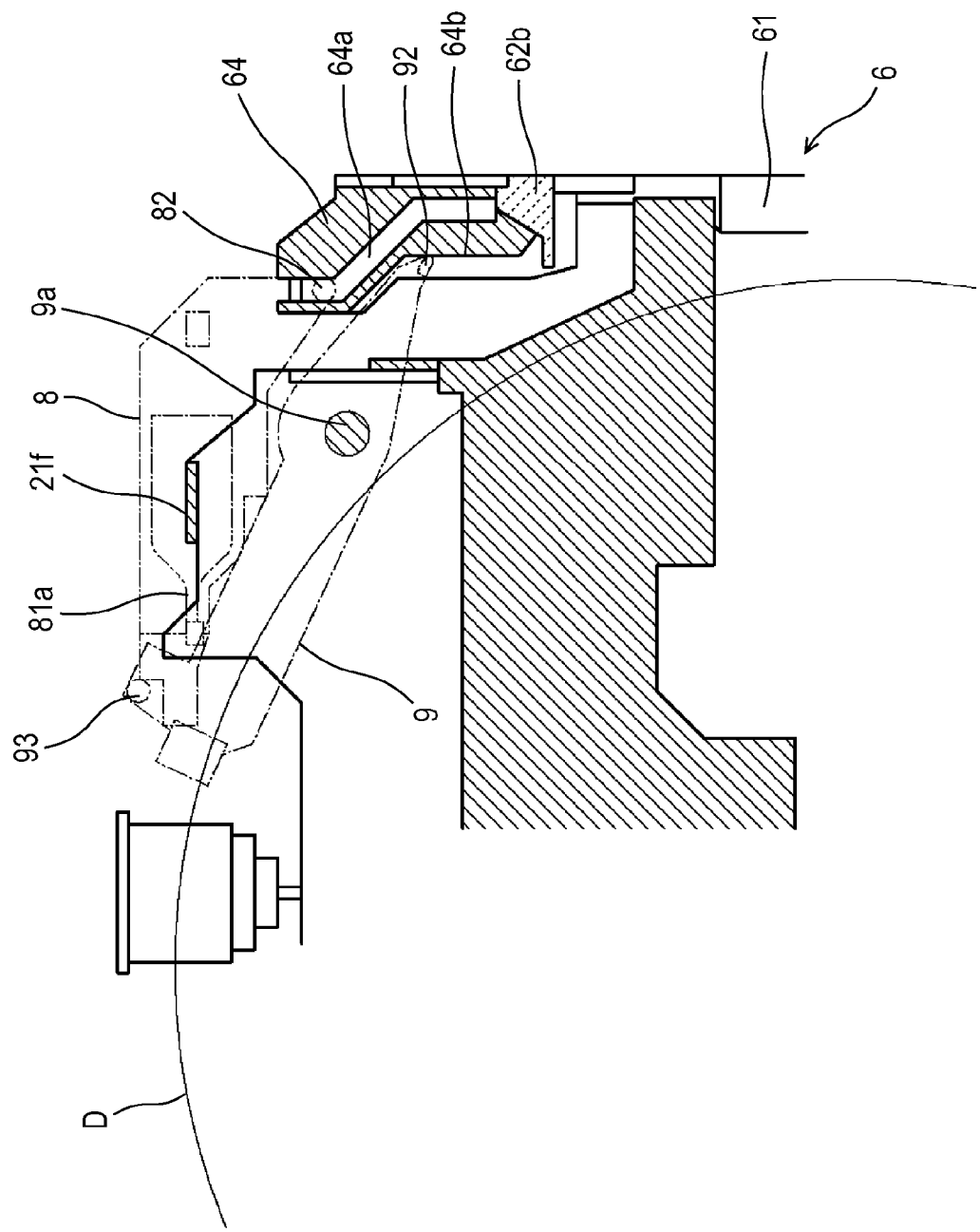
FIG. 19 shows a partially enlarged view illustrating the condition in which the restraining of the portion of the drive unit by the lock lever is released.

Thus, as illustrated in FIGS. 18 and 19, one end of the lock lever 8 is supported from below by the seat 64 of the drive cam 6 and the slide pin 82 is inserted in the cam hole 64a formed in the seat 64. Thereby, the lock lever 8 slides in the left-right directions in cooperation with the drive cam 6. The lock lever 8 restrains the end piece 21f by the slit 81a, as shown in FIG. 18, until the disc D is clamped on the turntable 22 by the clamp disk 25. When the disc D is clamped, the lock lever 8 moves in a direction away from the drive cam 6, as illustrated in FIG. 19, so as to release the restraining of the end piece 21f by the slit 81a.

Figure 20A:
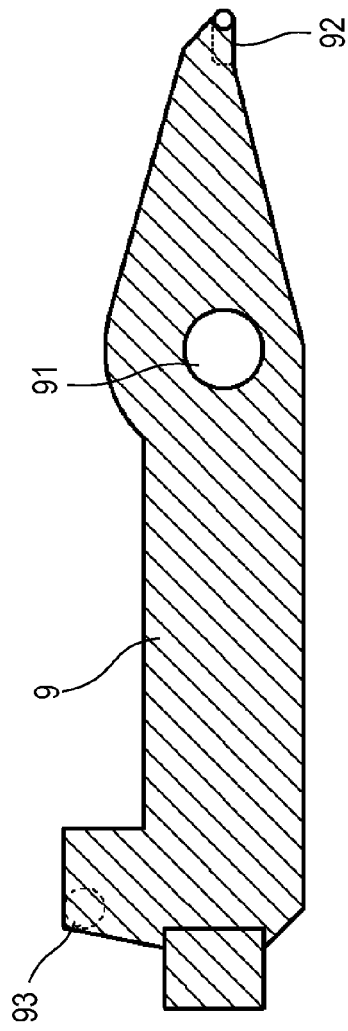
FIG. 20 shows a plan view and a front view illustrating a trigger lever for starting to actuate the drive cam.
Figure 20B:
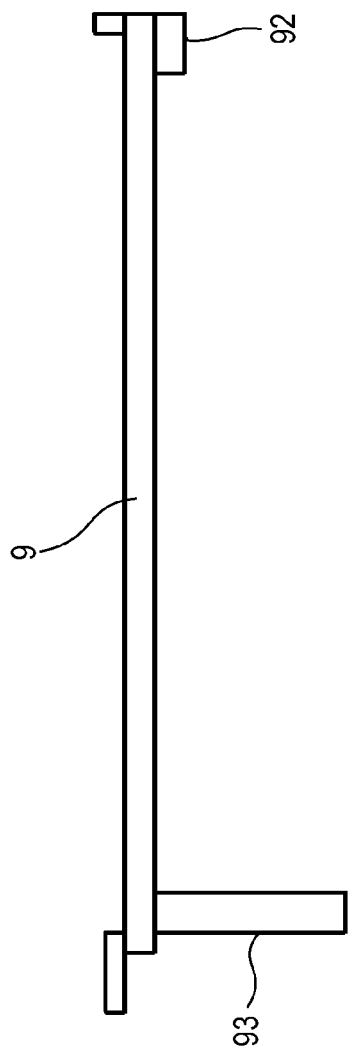

In FIGS. 18 and 19, reference numeral 9 denotes a trigger lever fitted to the top plate 12 (not shown in FIGS. 18 and 19) adjacently to the lock lever 8. The trigger lever 9 is configured to be swingable around a shaft portion 9a along the bottom face of the top plate 12. As illustrated in FIG. 20, an opening 91 in which the shaft portion 9a fits is formed in the trigger lever 9 and protruding portions 92 and 93 protruding downward are formed at both longitudinal ends of the trigger lever 9. As illustrated in FIGS. 18 and 19, one protruding portion 92 is in contact with the cam contour portion 64b of the drive cam, while the other protruding portion 93 extends downward on the disc loading path.

As illustrated in FIG. 18, as the protruding portion 93 is pressed by the disc D in loading, the trigger lever 9 swings clockwise in the figure and the other protruding portion 92 presses the protruding piece 62b of the rack member 62. Thereby, a portion of the rack member 62 (the rack 62a) meshes with the gear 58 starting the shifting of the drive cam 6 (see FIG. 11). When the drive cam 6 starts to shift downward in FIG. 18, the trigger lever 9 further swings clockwise in the figure by the pressing of the cam contour portion 64b to the protruding portion 92. Thereby, at the time point at which the clamping of the disc D has been completed, the protruding portion 93 is detached away from the edge of the disc D (see FIG. 19).

Hereinabove, embodiments of the invention have been described. However, the driven cam 7 may not necessarily move in the opposite direction to the drive cam 6, but both of the cams 6 and 7 may move in the same direction. In addition, the invention is not limited to the type in which a disc is clamped and transferred by the feed roller 31 and the guide plate 32. It is also possible to employ a configuration in which a roller that is allowed to perform only rotation is used in place of the guide plate 32 and a disc is clamped and transferred by the just-descried roller and the pivotable feed roller 31.

What is claimed is:

1. A disc transfer mechanism comprising:
a rotatable feed roller provided between a drive unit having a turntable for rotating a disc and an insert slot through which the disc is inserted and removed;
a roller supporting member pivotably supporting the feed roller and pivoted around a pivot shaft parallel to a rotation shaft of the feed roller between a disc transfer position at which the feed roller is in contact with the disk inserted into the insert slot and an evacuated position at which the feed roller is separated away from the disc supported by the turntable;
a drive cam engaged with the rotation shaft, pivoting the feed roller between the disc transfer position and the evacuated position while moving rectilinearly along one end of the drive unit and restraining the drive unit when the feed roller is at the disc transfer position; and a driven cam engaged with the rotation shaft moving rectilinearly along the other end of the drive unit by the pivoting of the feed roller and restraining the drive unit when the feed roller is at the disc transfer position.

2. The disc transfer mechanism according to claim 1, further comprising:

a first elastic member for urging the drive cam toward one end of a moving direction; and a second elastic member for urging the driven cam toward one end of a moving direction, wherein the urging force of the first elastic member and the second elastic member acts in a direction in which the feed roller is directed toward the disc transfer position through the engaged portions of the drive cam and the driven cam with the rotation shaft of the feed roller.

3. The disc transfer mechanism according to claim 1, further comprising:

a trigger lever provided adjacent to the drive cam, wherein the drive cam comprises a slidable rack member for meshing with a pinion of a gear transmission unit interposed between the drive cam and a drive source, wherein the trigger lever slides the rack member to a position meshing with the pinion while swung and pressed by the disc loaded by the feed roller to a predetermined position in the apparatus main body.

4. A disc drive apparatus comprising:

an apparatus main body having an insert slot for inserting a disc;

a drive unit having a turntable for rotating the disc and incorporated in the apparatus main body;

a rotatable feed roller provided between the insert slot and the drive unit;

a roller supporting member pivotably supporting the feed roller between a disc transfer position at which the feed roller is in contact with the disk inserted into the insert slot and an evacuated position at which the feed roller is moved away from the disc supported by the turntable so as to pivot the feed roller around a pivot shaft parallel to a rotation shaft of the feed roller;

a drive cam engaged with the rotation shaft of the feed roller, pivoting the feed roller between the disc transfer position and the evacuated position while moving rectilinearly along one peripheral end of the drive unit and restraining the drive unit when the feed roller is at the disc transfer position; and a driven cam engaged with the rotation shaft of the feed roller, moving rectilinearly along the other end of the drive unit by the pivoting of the feed roller and restraining the drive unit when the feed roller is at the disc transfer position.

5. The disc drive apparatus according to claim 4, further comprising:

a first elastic member for urging the drive cam toward one end of a moving direction thereof; and a second elastic member for urging the driven cam toward one end of a moving direction thereof, wherein the urging force of the first elastic member and the second elastic member acts in a direction in which the feed roller is directed toward the disc transfer position through the engaged portions of the drive cam and the driven cam with the rotation shaft of the feed roller.

6. The disc drive apparatus according to claim 4, wherein:

the drive cam has a slidable rack member, a gear transmission unit having a pinion meshable with the rack member is interposed between the drive cam and a drive source for rotation driving the feed roller, and a trigger lever for sliding the rack member to a position meshing with the pinion while swung and pressed by the disc loaded by the feed roller to a predetermined position in the apparatus main body is provided adjacent to the drive cam.

7. The disc drive apparatus according to claim 4, wherein:

the drive unit is elastically supported by an anti-vibration damper and each of the drive cam and the driven cam has a unit-securing-and-supporting portion for restraining an edge portion of the drive unit when the feed roller is at the disc transfer position.

* * * * *